July 11, 1933.  J. F. LINCOLN  1,917,531

ELECTRIC ARC WELDING APPARATUS

Filed Sept. 9, 1931  4 Sheets-Sheet 1

INVENTOR.
James F. Lincoln.
BY
Fay, Oberlin & Fay
ATTORNEYS

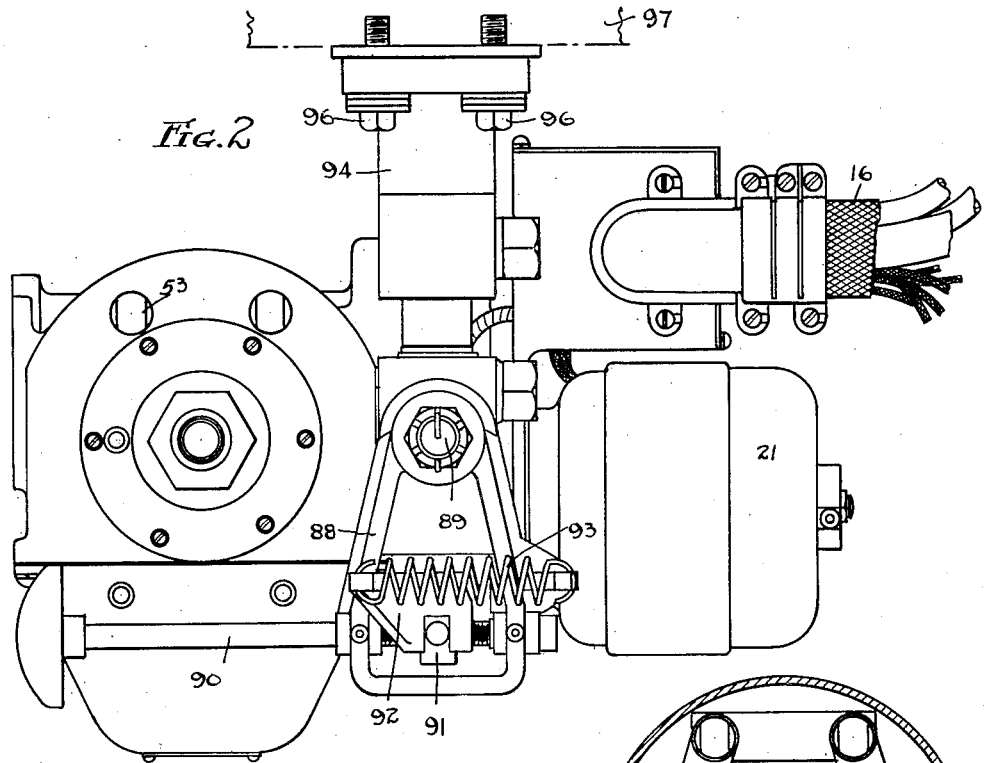
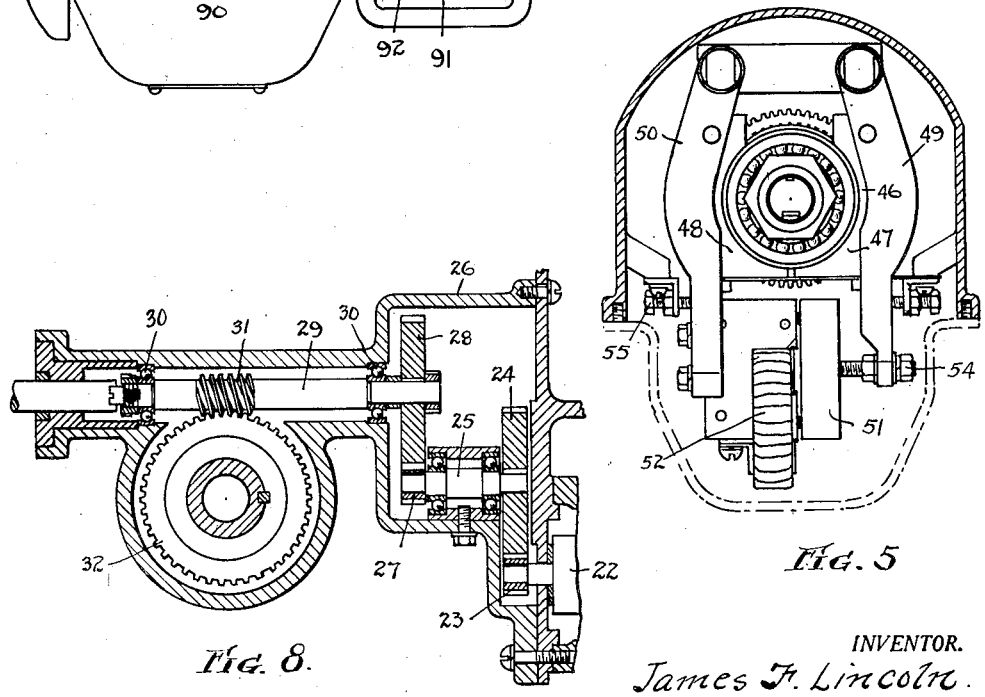

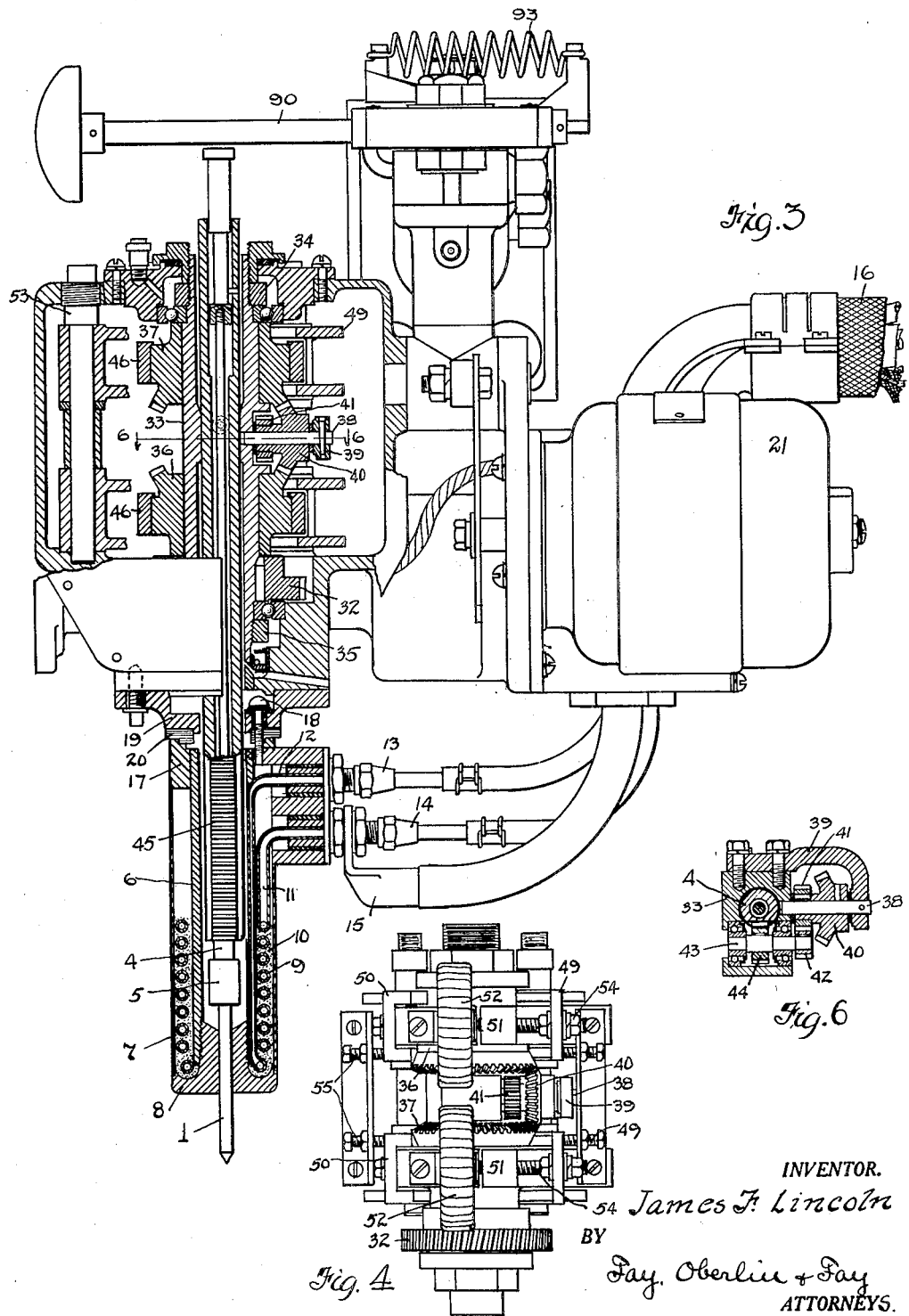

July 11, 1933. J. F. LINCOLN 1,917,531
ELECTRIC ARC WELDING APPARATUS
Filed Sept. 9, 1931 4 Sheets-Sheet 4
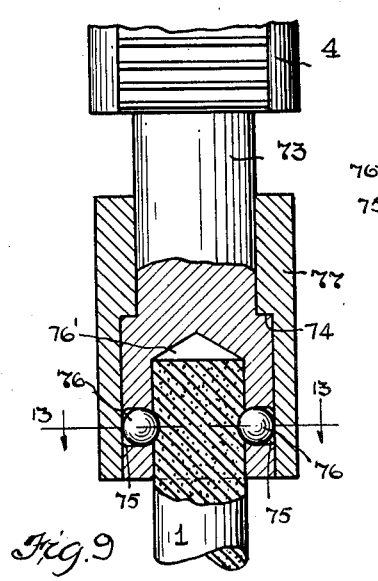
Fig. 9
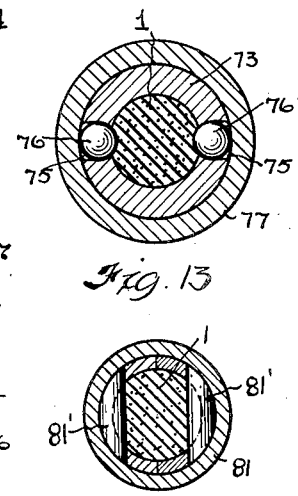
Fig. 13
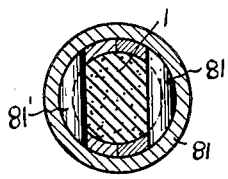
Fig. 14
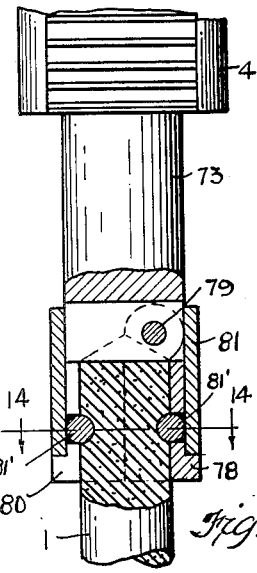
Fig. 10
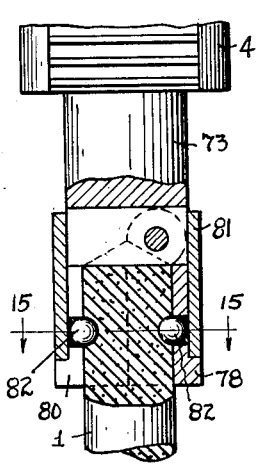
Fig. 11
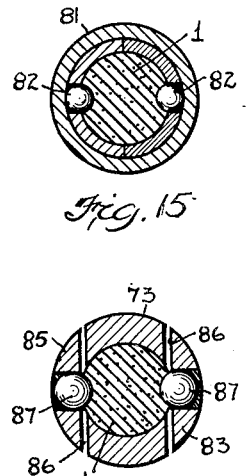
Fig. 15
Fig. 16
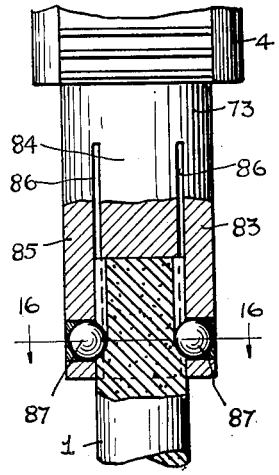
Fig. 12
INVENTOR.
James F. Lincoln
BY
Fay, Oberlin + Fay
ATTORNEYS Patented July 11, 1933

1,917,531

UNITED STATES PATENT OFFICE

JAMES F. LINCOLN, OF EAST CLEVELAND, OHIO, ASSIGNOR TO THE LINCOLN ELECTRIC COMPANY, OF CLEVELAND, OHIO, A CORPORATION OF OHIO

ELECTRIC ARC WELDING APPARATUS

Application filed September 9, 1931. Serial No. 561,906.

This invention, relating, as indicated, to electric arc welding apparatus, has more specific reference to a form of apparatus designed for the purpose of suitably supporting the welding electrode which is presented in arcing relation to the work. More particularly such apparatus is designed for the purpose of suitably supporting and rotating a non-fusible welding electrode and for the purpose of moving the same relatively to the work so that the proper length of welding arc will always be automatically maintained. It is among the objects of the invention to provide a form of apparatus capable of performing the above named functions. Other objects of this invention will appear as the description proceeds.

To the accomplishment of the foregoing and related ends, said invention, then, consists of the means hereinafter fully described and particularly pointed out in the claims, the annexed drawings and the following description setting forth in detail certain mechanism embodying the invention, such disclosed means constituting, however, but one of various mechanical forms in which the principle of the invention may be used.

In said annexed drawings:—

Figure 1:
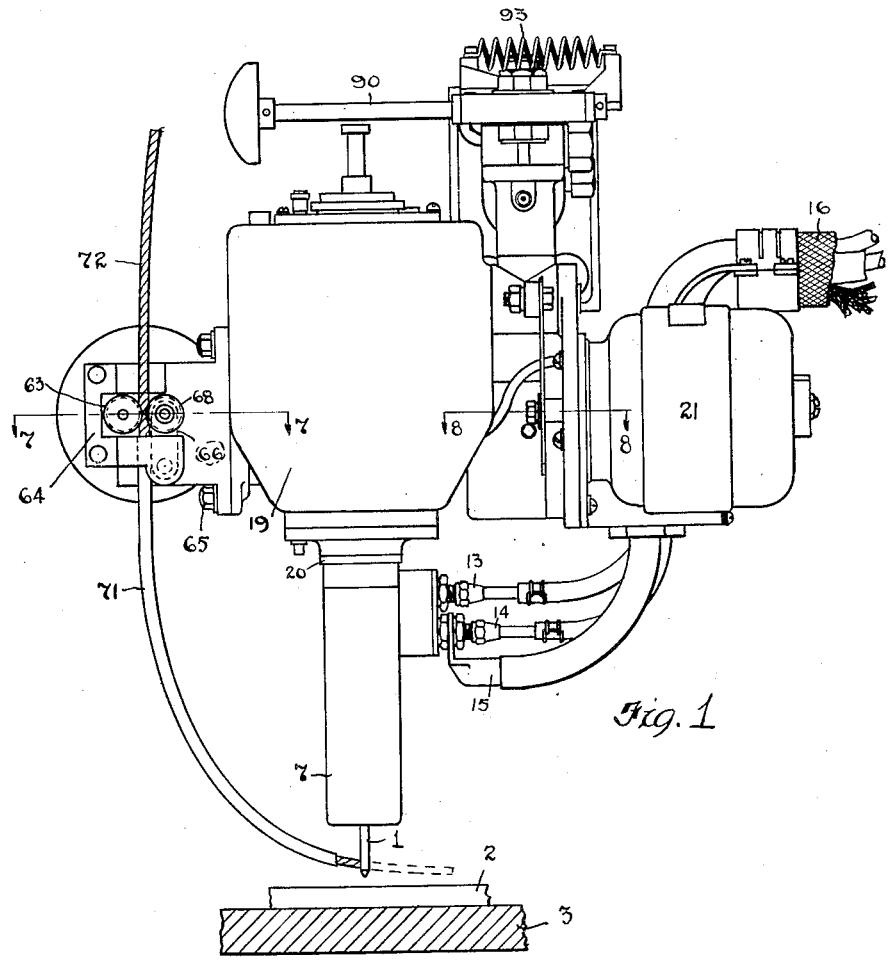
Figure 7:
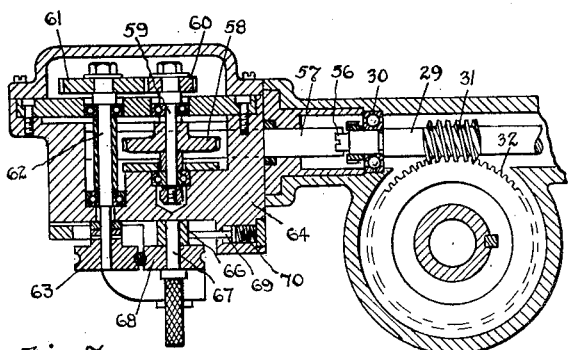

Fig. 1 is a side elevational view of the apparatus comprising this invention; Fig. 2 is a plan view of the apparatus illustrated in Fig. 1; Fig. 3 is a front elevational view, partially in section and drawn to an enlarged scale, of the apparatus illustrated in the previous figures; Fig. 4 is a side elevational view of the electrode feeding means forming a portion of the apparatus illustrated in the previous figures; Fig. 5 is a plan view of that portion of the apparatus illustrated in Fig. 4; Fig. 6 is a transverse sectional view of the apparatus illustrated in Fig. 3 taken on the plane substantially indicated by the line 6—6; Fig. 7 is a fragmentary sectional view of the apparatus illustrated in Fig. 1 taken on the plane substantially indicated by the line 7—7; Fig. 8 is a sectional view of a portion of the apparatus illustrated in Fig. 1 taken on a plane substantially indicated by the line 8—8; Figs. 9, 10, 11 and 12 are respectively enlarged views, partially in section, of modified forms of construction of the electrode gripping and supporting means forming a portion of the apparatus illustrated in the previous figures; and Figs. 13, 14, 15 and 16 are respectively transverse sectional views of the structures illustrated in Figs. 9, 10, 11 and 12, taken on planes substantially indicated by the lines 13—13, 14—14, 15—15 and 16—16.

Referring now more specifically to the drawings and more especially to Fig. 1, the apparatus comprising this invention is designed for the purpose of suitably supporting, in the manner hereinafter more fully explained, a welding electrode 1, which is preferably non-fusible and may be formed of carbon or like material, in arcing relation to the work 2, illustrated as supported on a suitable bed 3. The apparatus comprising this invention supports the electrode for axial movement relative to the work while such electrode is rotated continuously in a single direction.

The electrode 1 is supported from an electrode holder 4 by means of a coupling, generally indicated at 5, the specific construction of which will be hereinafter more fully explained. The electrode 1 and the holder 4 therefor are encompassed by a magnetic core 6 which is encompassed by a shell 7 of suitable material. Secured to the bottom of the shell 7 and the magnetic core 6 is a contact block 8 provided with an axially extending aperture through which the electrode 1 extends and which is of such diameter so as to closely grip the electrode. Positioned in the space intermediately of the magnetic core 6 and the shell 7 is a helical coil 9, preferably formed of tubing of electrically conductive material. The helical coil of tubing 9 is embedded in suitable refractory material 10 to properly support such helical coil within the shell or casing 7. The helical coil 9 has the terminals 11 and 12 extending laterally through the shell 7 and are in communication with suitable fluid conduits, such as 13 and 14, by means of which a cooling medium may be circulated through the helical coil 9. One or both of the terminals 11 and 12 of the helical coil 9 may be provided with an electrical conductor 15 which is secured thereto in any suitable manner for the purpose of leading the welding current away from the apparatus. All of the welding current passing from the work 2 upwardly through the arc and through the electrode 1 will flow through the contact member 8 and through the helical coil 9 and thence out through the leads 15. Leads 15 may be led away from the machine through a suitable flexible conduit 16 which also encloses the leads to the actuating mechanism presently to be described.

The tubular magnetic core 6 and the shell 7 are at their upper end secured to an abutment member 17 which is in turn, by means of bolts such as 18, secured to the casing 19 enclosing the electrode manipulating apparatus presently to be described. Insulating material such as 20 is interposed between the casing 19 and the abutment member 17 so as to insure that all of the welding current will be led back to the generator through the leads 15.

The mechanism comprising this invention which is employed for the purpose of manipulating the welding electrode, i. e., rotating the same and moving the same relatively to the work as the welding operation proceeds to maintain the length of the welding arc substantially constant, will now be described.

The power means employed for the purpose of actuating such mechanism consists of an electric motor 21, which is of the usual construction. As most clearly illustrated in Fig. 8, the armature shaft 22 of the motor 21 terminally carries a driving pinion 23 which meshes with a gear 24 keyed to a shaft 25 rotatably supported in suitable bearings provided therefor in the casing 26. The shaft 25 has at its opposite end keyed thereto a pinion 27 which in turn meshes with a spur gear 28 which is keyed to the inner end of a driving shaft 29. Driving shaft 29 is supported in suitable bearings 30 in the casing 26 and is provided with a worm 31 which meshes with a worm gear 32. The worm gear 32, as most clearly illustrated in Fig. 3, is keyed to a sleeve 33 which encompasses the upper portion of the electrode holder 4.

Secured to the outer periphery of the sleeve 33, by means of nuts 34 and 35, are bearings which rotatably support such sleeve in the casing enclosing the apparatus. Rotatable on the sleeve 33 are beveled gears 36 and 37 which are restrained against axial movement respectively by bearing against the gear 32 and the upper supporting bearing for the sleeve and projections, preferably formed integrally with and extending radially from the outer periphery of the sleeve 33.

The sleeve 33, as most clearly illustrated in Figs. 3 and 6, carries a stub shaft 38 which is additionally supported by means of a bracket 39 removably secured to the sleeve 33. Rotatably mounted on the shaft 38 is a beveled pinion 40 which meshes with both beveled gears 36 and 37. Secured to and rotatable with the beveled pinion 40 is a spur pinion 41 which meshes with a pinion 42 keyed to the terminal of a shaft 43 which is rotatably supported in the sleeve 33 and which carries a driving pinion 44 which meshes with an arc 45 formed on the outer surface of and extending axially of the electrode holder 4.

Each of the gears 36 and 37 is provided with a wearing ring 46 adapted to be engaged by brake shoes 47 and 48, most clearly illustrated in Fig. 5.

The brake shoes 47 and 48 are carried by arms 49 and 50 which are respectively provided at their adjacent ends with an armature 51 and an electromagnet 52. Energization of the electro-magnet 52 will draw the armature 51 thereto and accordingly cause a braking of the particular gear 36 or 37. The oscillatable arms 49 and 50 for the separate brakes for the gears 36 and 37 may be movably supported on a spindle 53 carried by the casing enclosing the apparatus. The brake shoe supporting arms 49 and 50 are rendered adjustable relatively to the gears 36 and 37 and to each other by means of screws such as 54 and 55.

The driving shaft 29, as most clearly illustrated in Fig. 7, continues and is provided with a driving jaw 56 which engages a shaft 57 which carries a worm (not shown) in mesh with a worm gear 58. The worm gear 58 is keyed to a rotatable shaft 59 which terminally carries a driving pinion 60 in mesh with a driven gear 61. The driven gear 61 is keyed to a rotatably supported shaft 62 which terminally carries a sheave 63. Mounted on the auxiliary casing 64, which is removably secured to the main casing 19 of the apparatus by means of bolts such as 65, is a link 66 which supports a stub shaft 67. The stub shaft 67 rotatably supports a sheave 68 which is urged against the sheave 63 by means of a plunger 69 actuated by a spring 70. The casing 64 has secured thereto in alignment with the space between the sheaves 63 and 68 a tube 71 which is directed to the vicinity of the welding arc and conducts a strip of combustible material 72 which is fed to the arc in the manner illustrated by means of the sheaves 63 and 68.

The particular form which the construction of the coupling 5 may take is most clearly illustrated in Figs. 9 to 16, both inclusive. Referring more specifically to Figs. 9 and 13, the particular form of coupling construction here illustrated consists of a stem 73 carried by the lower end of the electrode holder 4, such stem being provided with a shoulder 74 and a plurality of radial recesses 75 and an axial recess 76'. Encompassing the stem 73 and slidable with respect thereto is a collar 77 which has a reduced portion adapted to engage the shoulder 74 on the stem 73.

The welding electrode 1 employed in connection with this particular type of holder is provided with a plurality of circumferentially spaced semi-spherical indentations adapted to receive and be engaged by spherical locking members 76. The electrode 1 in this particular form of construction is assembled with the holder by having the sleeve 77 moved upwardly for a distance sufficient to permit the balls 76 to move outwardly sufficiently to permit the electrode to be inserted within the axial aperture 76'. With the electrode properly in position, the balls are introduced and secured in position by means of the sleeve 77 occupying the position illustrated in Fig. 9.

A construction somewhat similar to that illustrated in Figs. 9 and 13 and for the purpose of effecting a like connection between the welding electrode and its holder is illustrated in Figs. 10 and 14. In these last named figures is illustrated a construction in which the lower end of the stem 73 is split and provided with a pivotally supported segment 78 supported on the stem by means of a pin such as 79. The segments 78 and 80 forming the terminal of the stem 73 are each provided with chordal pins 81' adapted to enter complementary recesses provided therefor in the upper terminal of the welding electrode. The pins 81' carried by the segments 78 and 80 are maintained in proper contact with the electrode by means of a sleeve such as 82 which is movably supported by the stem 73.

The further modification of the means for securing the welding electrode to its holder, as illustrated in Figs. 11 and 15, differs from the structure disclosed in Figs. 10 and 14 in that the latter construction is provided with semi-spherical electrode engaging and supporting members 82 which are carried by the segments 78 and 80 forming the terminal of the stem 73 of the electrode holder 4. Here again a sleeve such as 81, slidable with respect to the stem 73, is employed for maintaining the segments 78 and 80 in proper assembled relation during the operation of the apparatus.

A somewhat different modification, which affords the desired connection between the welding electrode and the stem 73, is illustrated in Figs. 12 and 16. In these last named figures it will be noted that the stem 73 is divided into three segments 83, 84 and 85 by means of axial slots 86. The slotted terminal of the stem 73 is provided with an axially extending aperture adapted to receive the terminal of the welding electrode and the segments 83 and 85 carry spherical contact members 87 which normally extend for a short distance into the recess into which the welding electrode extends. When this form of construction is employed, the welding electrode will have axially extending grooves on its outer periphery of substantially semi-circular cross section to receive the members 87. The function and operation of these forms of construction for securing the welding electrode to its holder will be dealt with hereinafter more fully during the course of the description of the operation of the apparatus.

The hereinbefore described apparatus for supporting and properly manipulating the welding electrode relatively to the work is supported on a bracket generally indicated at 88. The bracket 88 is oscillatably supported on a vertically disposed shaft 89 and is adjustable relatively thereto by means of a hand screw 90 which carries a block 91 in engagement with a portion 92 of the supporting structure of the apparatus. A tension spring 93 may be employed for the purpose of insuring that there will be no vibration of the supported welding apparatus, which might be occasioned by virtue of any looseness present in the adjusting apparatus of which the hand screw 90 is a part. The pin 89 which oscillatably supports the entire welding mechanism is in turn supported by a bracket 94 adapted to be removably secured by means of screws, such as 96, to any suitable supporting frame structure diagrammatically illustrated at 97.

The operation of the hereinbefore described form of construction may be briefly described as follows: In connection with the welding circuit, in which is included the welding electrode 1 supported and manipulated by the apparatus hereinbefore described, a suitable relay will be employed which may be adjusted so as to supply electric current to either one or the other of the electromagnetic brakes associated with the gears 36 and 37 as the arc voltage varies to either side of a predetermined value. The armature shaft 22 of the motor 21 will rotate continuously in a single direction and preferably at a uniform speed. This rotation of the motor will through the driving shaft 29, worm 31 and worm gear 32, effect rotation of the electrode 1 and the gears 36 and 37 and the beveled pinion 40. When the arc voltage varies due to a variation in the length of the welding arc from a predetermined value, the relay will supply current to one or the other of the electro-magnetic brakes associated with the gears 36 and 37 so that one of such gears will be braked against rotation.

When one of the gears 36 and 37 is braked against rotation, the continued rotation of the sleeve 33 will effect a rotation of the beveled pinion 40 which will accordingly rotate the spur pinion 44 to move the electrode holder 4 axially either toward or away from the work. This movement of the electrode holder will continue until the unbalanced condition, which has caused an energization of one of the brakes through the relay, has been corrected, whereupon the particular brake will be deenergized and the arc maintained at the proper length until a further change in such arc lengths occurs, which will be effected through the relay in a braking of a particular one of the gears 36 and 37. The direction of rotation of the beveled pinion 40 depends upon which gear 36 or 37 is braked and hence the electrode will be fed axially either toward or away from the work so that the arc length is maintained constant.

The rotation of the drive shaft 29, which in turn through the train of gears previously described rotates the sheave 63, will cause a strip of combustible material, such as 72, to be fed to the vicinity of the welding arc to therein produce a protective blanket over the pool of molten metal to shield the same from coming in contact with the atmosphere.

In order to compensate for inaccuracies in the axial alignment of the welding electrode and its holder, the devices illustrated in Figs. 9 to 16, both inclusive, afford a driving connection between the holder and the electrode which is capable of universal movement. Should the welding electrode therefore be slightly out of axial alignment with its holder, the electrode will not be broken or damaged as the same is rotated by the holder.

From the foregoing description it will be noted that a form of apparatus is provided whereby the welding electrode may be rotated continuously as the welding operation proceeds and the apparatus associated with the holder is capable of effecting an adjustment of the electrode relatively to the work so that the length of the arc may be automatically maintained at a predetermined constant length. It is believed that a further description of the principles of this invention need not be given for those familiar with the art. In a number of instances a detailed description of certain minute features of construction has not been given inasmuch as the same will be readily apparent from the drawings.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:

1. In electric arc welding apparatus, the combination of a welding electrode, a contact member for carrying the welding current snugly engaging said electrode and supporting the same for rotation about its longitudinal axis, a rotatable spindle in substantial axial alignment with said electrode, and means establishing flexible driving communication between said spindle and electrode.

2. In electric arc welding apparatus, the combination of a welding electrode, a contact block for carrying the welding current provided with an aperture through which said electrode extends whereby said electrode is snugly engaged and supported for rotation about its longitudinal axis, a rotatable spindle in substantial axial alignment with said electrode, and means establishing flexible driving communication between said spindle and electrode.

3. In electric arc welding apparatus, the combination of a welding electrode, a contact member for carrying the welding current snugly engaging said electrode and supporting the same for rotation about its longitudinal axis, a rotatable spindle in substantial axial alignment with said electrode, and complementary rounded projections and recesses on said spindle and electrode establishing flexible driving communication therebetween.

4. In electric arc welding apparatus, the combination of a welding electrode, a contact member for carrying the welding current snugly engaging said electrode and supporting the same for rotation about its longitudinal axis, a rotatable spindle in substantial axial alignment with said electrode, and complementary semi-spherical projections and recesses on said spindle and electrode establishing flexible driving communication therebetween.

5. For use in electric arc welding apparatus, a non-melting electrode terminally provided with recesses on its lateral periphery whereby the same may be flexibly connected to a rotary spindle.

6. For use in electric arc welding apparatus, a carbon electrode terminally provided with recesses on its lateral periphery whereby the same may be flexibly connected to a rotary spindle.

7. For use in electric arc welding apparatus, a non-melting electrode terminally provided with semi-spherical recesses on its lateral periphery whereby the same may be flexibly connected to a rotary spindle.

Signed by me this 2nd day of September, 1931.

JAMES F. LINCOLN.